United States Patent [19]

Morinaga et al.

[11] Patent Number: 4,948,452
[45] Date of Patent: Aug. 14, 1990

[54] APPARATUS FOR LINING PIPE LINES INCLUDING LIQUID SEAL MEANS

[75] Inventors: Akio Morinaga, Fujisawa; Isaburo Yagi, Amagasaki; Hideo Maruyama, Osaka; Akifumi Yamamoto, Takatsuki, all of Japan

[73] Assignees: Tokyo Gas Co., Ltd., Tokyo; Ashimori Industry Co., Ltd., Osaka, both of Japan

[21] Appl. No.: 387,770

[22] Filed: Aug. 1, 1989

Related U.S. Application Data

[62] Division of Ser. No. 236,995, Aug. 26, 1988, Pat. No. 4,883,557.

[30] Foreign Application Priority Data

Aug. 26, 1987 [JP] Japan .................... 62-212464

[51] Int. Cl.⁵ .......................................... B29C 63/36
[52] U.S. Cl. ........................ 156/382; 156/423; 156/538; 277/135; 425/387.1
[58] Field of Search .............. 156/156, 165, 287, 294, 156/382, 423, 538; 138/97; 264/269, 516, 573; 405/154; 427/230, 238; 425/387.1; 34/242; 277/135

[56] References Cited

U.S. PATENT DOCUMENTS

| | | | |
|---|---|---|---|
| 1,595,473 | 8/1926 | Minton | 34/242 |
| 2,029,985 | 2/1936 | Clark et al. | 34/242 |
| 3,415,083 | 12/1968 | Okazaki et al. | 34/242 |
| 3,504,177 | 3/1970 | Walker et al. | 277/135 |
| 4,334,943 | 6/1982 | Zenbayashi et al. | 156/294 |
| 4,350,548 | 9/1982 | Zenbayashi et al. | 156/423 |
| 4,368,091 | 1/1983 | Ontsuga et al. | 156/423 |
| 4,385,885 | 5/1983 | Wood | 156/423 |
| 4,427,480 | 1/1984 | Kamuro et al. | 425/387.1 |
| 4,668,125 | 5/1987 | Long, Jr. | 156/294 |
| 4,685,983 | 8/1987 | Long, Jr. | 156/423 |

*Primary Examiner*—Michael W. Ball
*Assistant Examiner*—Steven D. Maki
*Attorney, Agent, or Firm*—Birch, Stewart, Kolasch & Birch

[57] ABSTRACT

Method and apparatus for lining pipe lines, especially those buried in the ground and having a large diameter, according to the so-called evagination-lining technique by using a compressed gas as a pressurized fluid, which is so improved as to secure complete sealing of a pressure container for inserting the lining material into a pipe line by using a specific sealing device using a liquid in place of a mechanical sealing device while preventing a binder applied onto the inner surface of the lining material from being squeezed backwards when the lining material is introduced into the pressure container.

5 Claims, 3 Drawing Sheets

APPARATUS FOR LINING PIPE LINES INCLUDING LIQUID SEAL MEANS

BACKGROUND OF THE INVENTION

1. Field of the Invention:

The present invention relates to a method and apparatus for lining pipe lines, especially those buried in the ground, such as gas conduits, city water pipe lines, sewage pipe lines, oil pipe lines, construction pipe lines like power transmission wires or telecommunication cables, etc., suitably those having a large inner diameter, for the purpose of repair or reinforcing these pipe lines. More particularly, the present invention relates to a method and apparatus for lining such pipe lines, especially those buried in the grounds, which is so improved as to secure complete sealing of a pressure container for inserting the lining material into a pipe line while preventing a binder applied onto the inner surface of a tubular lining material from being squeezed backwards when the lining material is introduced into the pressure container.

2. Description of the Prior Arts:

A variety of methods utilizing the principle of evagination (or eversion) have been proposed from the past as a means for lining pipe lines with a tubular lining material. These pipe-lining methods which are generally called "evagination-lining" methods are carried out in such manner that a flexible lining material in the form of a tube previously provided on the inner surface thereof with a binder is inserted into a pipe line to be treated and is allowed to advance therein while turning the lining material inside out under fluid pressure whereby the lining material is bonded onto the inner surface of the pipe line by the aid of the binder. According to a pipe-lining method of this type, it is unnecessary to dig up a pipe line over its full length on application of a lining material thereto and the method is operable simply by forming manholes at both terminal ends of the pipe line to be treated. The pipe-lining work itself can be done within a short period of time even for a long pipe line and so these methods are now widely employed as an advantageous pipe-lining technique.

In these pipe-lining methods, a liquid such as water or a gas such as air is generally used as a fluid to be introduced under pressure into a pressure container to push a tubular lining material forward under evagination.

The method disclosed in Japanese Laid-open Patent Appln. No. Sho. 50-98984 (corres. to U.S. Pat. No. 4,064,211) is an example of the so-called evagination-lining methods wherein water is used as the fluid. According to this method as schematically shown in FIG. 5, one end of a tubular lining material provided on the inner surface thereof with a binder is annularly fastened in an evaginated state to one end of a pipe line to form a turning point of evagination and water is introduced into the interior of the lining material from the space opened in rear of the turning point of evagination whereby the lining material is allowed to advance within the pipe line by the pressure of water introduced while being turned inside out to attain lining of the pipe line. As shown in FIG. 4, a small tube is inserted into the pipe line and warmed water is circulated to accelerate curing of the binder. In this method wherein water is used for evagination of the lining material and warmed water is used for accelerate curing of the binder, a considerably large amount of water and warmed water is required in case of lining a long pipe line, and so the operation for evagination of the lining material and circulation of warmed water is extremely troublesome. In particular, it is difficult to bond the lining material completely onto the inner surface of the pipe line when the pipe line is inclined or bent in vertical direction. The pressure of water varies according to the height of the ground where the lining treatment is carried out; unnecessary high pressure is applied to the lining material when the ground is low so that there may be a fear of destroy of the lining material and/or pipe line. If the ground is high, on the other hand, the pressure of water becomes lower and, in the extreme case, even a negative pressure is exerted to the lining material so that the lining material once applied onto the pipe line is peeled off or may be collapsed by external pressure to clog the pipe line. Further, a tremendous operation is necessary for removal of a large amount of water used for evagination of the lining material and acceleration of curing the binder after completion of the lining treatment. In addition, residual water in the lining material after the pipe-lining treatment gives a bad influence on the heat efficiency of warmed water to be introduced in the subsequent step for accelerating curing of the binder so that a long period of time is needed for the curing of the binder. Thus, the evagination-lining methods wherein a liquid such as water is used for producing fluid pressure require troublesome operations which render these methods economically unattractive.

In case the fluid to be pressurized is a gas such as air, on the other hand, control of the fluid pressure as well as removal of the fluid after completion of the lining treatment is easy and technically preferable. In the methods disclosed in U.S. Pat. Nos. 4,368,091 and 4,334,943, for example, compressed air is usually used as the pressurized fluid for causing evagination. These methods enable control of the pressure of air required for evagination of the lining material by the aid of a pressure container, and concurrently adjustment of the amount of a binder to be applied onto the inner surface of the lining material inside or outside the pressure container. These methods, in particular, the method in the latter mentioned patent, are especially excellent along the existing pipe-lining methods in that the lining operation can be carried out, without forming any wrinkle on the lining material and forming any narrow path in bend portions of the pipe line, by adjusting the speed of the lining material in its advancing movement within the pipe line by the aid of a special evagination-inducing belt drawn from the opposite side of the pipe line. In such pipe-lining methods using compressed air as the pressurized fluid, however, a problem arises in sealing of the pressure container to prevent leakage of compressed air. In this case, compressed air is mechanically sealed at a slit of the pressure container through which a tubular lining material is fed in flattened state. To secure sealing of the pressure container for preventing leakage of compressed air, a sealing member at the slit has to be contacted under pressure with the lining material fed therethrough. In recent years, tubular lining materials are provided in the majority of cases with a binder prior to being transported to a place where the pipe-lining treatment is to be carried out. If a tubular lining material previously provided on the inner surface thereof with a binder is fed in flattened condition into the pressure container, the binder in the lining material is squeezed at the slit and partially remains in rear of the slit so that the lining material cannot be provided with a sufficient amount of the binder to weaken the bonding force between the lining material and the pipe line.

In Japanese Laid-open Patent Appln. No. Sho. 55-15852, there is disclosed a pipe-lining method wherein a tubular lining material previously provided in the inner surface thereof with a binder is fed through a slit 29 into a pressure container 6 having a simple structure (FIGS. 6 and 8). According to this method, a frictional resistance of the lining material at the slit 29 is so high that a high air pressure is required to perform evagination of the lining material. Further, the binder is strongly squeezed out at the slit 29 so that the lining material cannot be provided with a sufficient amount of the binder.

In Japanese Laid-open Patent Appln. No. Sho. 57-38114 (corres. to U.S. Pat. No. 4,427,480), there are disclosed a method and an apparatus for lining pipe lines according to the so-called evagination lining method, wherein a specific sealing device is used for the conveyance of a sufficient amount of a binder into the pressure container without being pushed back so that bonding of the lining material to the pipe line can be effected satisfactorily. According to this apparatus, the pressure container is provided with a special sealing device in place of a simple slit and this sealing device comprises a toothed drum rotatable on the path of a lining material provided in the inner surface thereof with a binder, a sealing member in close contact with the toothed drum to secure air-tightness and a squeezing base positioned beneath the toothed drum to support the lining material, and is operated in such manner that the lining material interposed between the rotating toothed drum and the squeezing base is squeezed in at least 2 positions at all times with the adjacent teeth on the drum lest the binder should be pushed back. The pressure container is mechanically sealed by this specific sealing device so that the lining material enclosing a sufficient amount of the binder can be inserted into a pipe line without the binder being pushed back. However, this apparatus still has some problems in actual use; the sealing device is complicate in structure and the sealing effect is not perfect so that the compressed air used a propellant for the lining material tends to leak out.

Under the above mentioned circumstances, there is still a great demand for developing a pipe-lining method wherein evagination of the lining material is carried out by using a compressed gas but all the problems mentioned above incidental to the use of a compressed gas are solved.

BRIEF SUMMARY OF THE INVENTION

Accordingly, it is an object of the present invention to provide a method for lining pipe lines wherein all the problems raised in sealing of the pressure container in the conventional methods are solved.

It is another object of the present invention to provide a method for lining pipe lines which is improved in sealing of the pressure container while preventing a binder enclosed in the lining material from being squeezed backwards when the lining material is introduced into the pressure container.

It is still another object of the present invention to provide an apparatus for lining pipe lines which is improved in the pressure container so as to have a sealing mechanism using water or an aqueous or organic solution or suspension.

It is further object of the present invention to provide an apparatus for lining pipe lines which attains perfect sealing of the pressure container in a simple means without the binder enclosed in the lining material being squeezed out.

Other objects, features and advantages of the present invention will become apparent more fully from the following description.

DETAILED DESCRIPTION OF THE INVENTION

As a result of extensive researches made by the present inventors to develop a new method for lining pipe lines which utilizes a gas as a fluid for causing evagination of the lining material but is improved so as to secure complete sealing of a pressure container without causing any reduction in the amount of a binder enclosed in the lining material, it has now been found that all of the problems raised in the conventional pipe-lining methods and apparatus regarding the sealing of a pressure container can be solved entirely by improving the structure of the pressure container in such manner that the pressure container having an enlarged part forming a confined space in its front part is integrally combined in its rear part with an elevated tower part designed to pass the lining material therethrough and is charged with a liquid isolating the confined space from the open air. The present invention has been accomplished on the basis of the above finding.

In accordance with one embodiment of this invention, there is provided a method for lining pipe lines which comprises inserting a flexible tubular lining material provided on the inner surface thereof with a binder and on the outer surface thereof with an air-impervious coating into a pipe line through an induction pipe, with the front end of the lining material being fixed annularly to one end of the pipe line to form a turning point of evagination, and allowing the tubular lining material to advance within the pipe line while moving the turning point of evagination forwards from one end to the other end of the pipe line to turn the tubular lining material inside out under fluid pressure thereby applying the evaginated tubular lining material onto the inner surface of the pipe line over its full length with the binder on the exterior surface of the evaginated tubular lining material being interposed between the pipe line and the tubular lining material, characterized in that a portion of the tubular lining material positioned in rear of the pipe line is passed through an elevated tower filled with a liquid and then through a confined space, the liquid isolating the confined space from the open air, and a pressurized gas is introduced into the confined space to produce the pressure for moving the turning point of evagination forwards.

In accordance with another embodiment of this invention, there is provided an apparatus for lining pipe lines in such manner that a flexible tubular lining material provided on the inner surface thereof with a binder and on the outer surface thereof with an air-impervious coating is inserted into a pipe line, with the front end of the lining material being fixed annularly to one end of the pipe line to form a turning point of evagination, and allowed to advance within the pipe line while moving the turning point of evagination forwards from one end to the other end of the pipe line to turn the tubular lining material inside out under fluid pressure thereby applying the evaginated lining material onto the inner surface of the pipe line over its full length with the binder on the exterior surface of the evaginated tubular lining material being interposed between the pipe line and the lining material, which apparatus comprises an induction pipe provided at the front end thereof with a fastener for annularly fixing the tubular lining material, a pressure container connected to the rear end of the induction pipe and comprised of a front enlarged part forming a confined space for producing a pressurized gas and a rear elevated tower part, the pressure container being partially filled with a liquid isolating the confined space from the open air, and an inlet for introducing a compressed gas, which is formed in the induction pipe and/or the pressure container.

The lining method and apparatus of the present invention has various features as compared with the conventional similar lining methods and apparatus wherein a gas or liquid is used as a pressurizing medium and a tubular lining material enclosing a binder is introduced into a pressure container directly through a slit. One of the features of the present invention resides in the use of a combination of a gas and a liquid in the pressure container in such manner that a gas is used under pressure in a pressure container, as in the conventional methods, for pushing the lining material forward within the pipe line and a liquid is used in a specific sealing device integrally combined with the pressure container for isolating a confined space pressurized by the gas from the open air. Another feature of the present invention resides in the use of a pressure container of a specific structure which consists of an ordinary confined space where the force for pushing the lining material forwards is produced by the pressurized gas and a sealing device integrally combined with the confined space and shaped typically in the form of a U-shaped manometer filled with a liquid isolating the confined space from the open air. Further feature of the present invention resides in introduction of the lining material provided in the inner surface thereof with a binder into a pipe line under evagination through the specific sealing device in the form of an elevated tower filled with a liquid as a sealant and then through the confined space kept under pressure with the gas whereby the lining material can be introduced into the pipe line under a relatively low pressure without the binder being squeezed out when the lining material is introduced into the pressure container.

The method and apparatus of this invention can be applied to the lining of any kind of pipe lines such as city water pipe lines, sewage pipe lines, gas conduits, petroleum pipe lines, and pipe lines for power transmission wires, telecommunication cables, etc. These pipe lines may be made of various kinds of materials, such as steel, copper, various alloys, concrete, ceramics, glass and rigid resinous materials. In the present invention, a flexible tubular lining material can carry a sufficient amount of a binder and can be evaginated under a relatively low pressure so that the present invention can advantageously be applied to the lining of a pipe line having a large inner diameter such as a sewage pipe line, a city water pipe line having a large diameter.

In this invention, the tubular lining materials should be so flexible that they can be evaginated under the pressure of a gas such as compressed air, and so are generally selected from tubular textile jackets and flexible plastic tubes. The use of tubular textile jacket is preferable which are commercially available and usually manufactured by weaving warps and a weft in a seamless tubular form by means of an annular weaving machine. Fibrous materials for the warps and the weft may be of inorganic nature, such as asbestos or glass, in addition to ordinary natural and synthetic fibers such as cotton, polyamide, polyester, polyurethane fibers or a mixture thereof. On actual use, the tubular lining material is preferably free of any water of moisture which may cause undesirable reaction with a binder used. These tubular lining materials are properly selected according to strength or resistance required for repair or reinforcement of the pipe line to be treated. The tubular lining material is usually provided on its external surface (which will be the inner surface after evagination in the pipe line) with an air-imperviou resinous coating which has to be chemically resistant to a fluid to be passed through the pipe line. Accordingly, natural or synthetic rubber, polyester, polyamide, polyurethane or the like is generally used as a material for the coating. For general purposes, elastic polyester is preferably used because of its flexibility and high strength.

The binder used in this invention is generally selected from commercially available various kinds of organic binders. Considering the length of pot life, the use of a binder of epoxy series is preferable.

The gas utilizable for evagination of the tubular lining material is usually air, nitrogen or carbon dioxide. The gas pressure is suitably controlled so that the tubular lining material may be allowed to advance within the pipe line at a moderate speed. The liquid to be used in the pressure container as a sealing medium for isolating the confined pressurizing space from the open air is usually selected from water, an aqueous or organic solution or dispersion which is inert to the resinous material constituting the air-impervious coating on the exterior surface of the tubular lining material. Such inert aqueous or organic solution or dispersion should preferably have a specific gravity greater than 1. Examples of such solution and dispersion include aqueous solutions of various sugars and salts and aqueous dispersions of insoluble salts such as a stabilized dispersion of barium sulfate commercially available under the name of Telnite The present invention can more fully be understood from the following description taken in conjunction with accompanying drawings in which:

Figure 1:
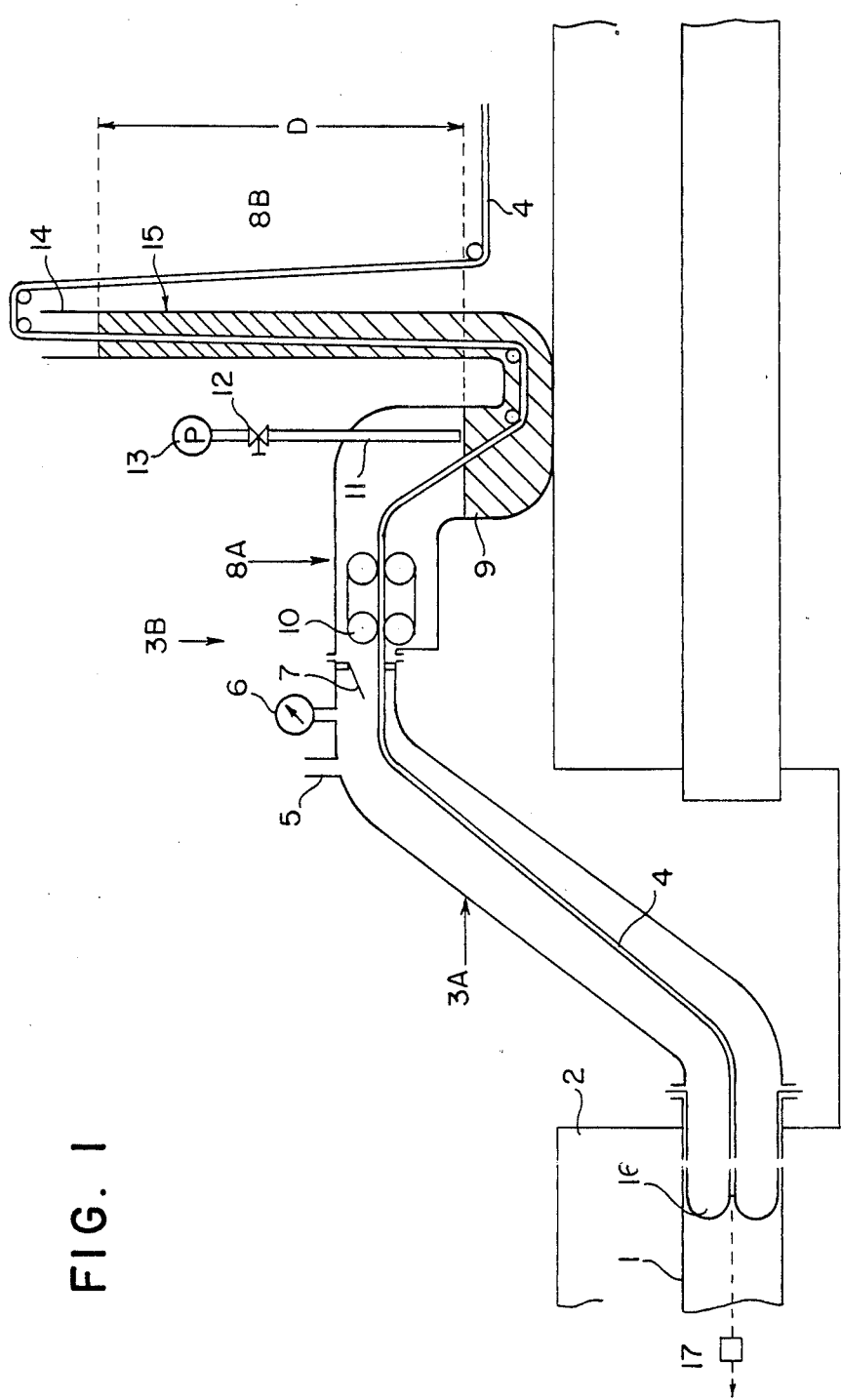
FIG. 1 is a schematic view of an example of the apparatus for carrying out the method of this invention.

Throughout the drawings, each reference numeral has commonly the same meaning, and the shape may be modified according to the situation in actual use.

In FIG. 1 schematically showing the working of this invention using one example of the apparatus, a pipe line 1 is buried in the ground and a hole 2 for the pipe-lining treatment is formed in the ground along the pipe line 1 at a proper interval, usually from several ten meters to several kilometers. In the hole 2, the pipe line 1 is cut out by a certain length for introducing a tubular lining material 4 thereinto. The apparatus of this invention for carrying out the pipe-lining treatment, which comprises an induction pipe 3A and a pressure container 3B is assembled in the neighborhood of the hole 2 and the induction pipe 3A is connected to one end of the pipe line 1 in such manner that the tubular lining material 4 provided in the inner surface thereof with a binder and passed through the interior space of the induction pipe 3A is also connected annularly to the one end of the pipe line 1. The induction pipe 3A is usually made of a metal or an alloy but may be made of a rigid plastic resin or even a thick fibrous material coated on both surfaces with an air-impervious resin. The induction pipe 3A itself is connected in the rear end (the right side in the drawing) to the pressure container 3B. In this example, an inlet 5 for compressed air and a pressure gauge 6 are mounted to the rear part of the induction pipe 3A but the inlet 5 may be mounted to the induction pipe 3A and/or the pressure container 3B and the gauge 6 may be mounted to the pressure container 3B. As will be obvious from the reason described hereinafter, however, it is preferable that the inlet 5 and the gauge 6 are mounted to the induction pipe 3A in this example. The induction pipe 3A is provided in the rear part thereof with a butterfly valve 7. When the pressure container 3B is disconnected from the induction pipe 3A after completion of the pipe-lining treatment, this butterfly valve 7 is closed to maintain the interior spaces of the induction pipe 3A and the pipe line 1 under pressure.

The pressure container 3B comprises a front enlarged part 8A and a rear elevated tower part 8B and the former enlarged part 8A is larger in capacity than the rear tower part 8B. The pressure container 3B is partially filled with a liquid 9. When the pressure container 3B is not in action, the level of the liquid 9 in the front enlarge part 8A and that in the rear elevated tower part 8B are equal. In this example, a pair of belt conveyer 10 is installed in the interior space of the front enlarged part 8A for introducing the tubular lining material 4 in flattened condition into the pipe line 1 at a definite speed. However, these belt conveyers 10 may be installed outside the apparatus of this invention. The front enlarged part 8A is provided with a liquid supply pipe 11 which is extended through a valve 12 to a pump 13. When the pressure container 3B is empty, the liquid 9 is introduced thereinto through the pipe 11 by the action of the pump 13. The supply of the liquid 9 is stopped by operating the valve 12, but the liquid may be additionally supplied at need according-to the pressure required for evagination of the lining material 4.

The rear elevated tower part 8B is greater in height but smaller in capacity than the front enlarged part 8A. The top 14 of the rear tower part 8B is opened and the higher part 15 of the rear tower part 8B may be modified according to the pressure required for evagination of the lining material 4. For example, the diameter of the higher part may become greater than that of the lower part, or the length of the tower may be varied. On actual use, the rear tower part 8B is set in upright position where the top 14 is sufficiently higher than the front enlarged part 8A. If the apparatus is already assembled and has to be removed to the hole 2 where the pipe-lining treatment is to be carried out, the elevated tower part 8B may preferably be designed so that it can be bent or laid at the lower part thereof to reduce its height for facilitating transportation of the apparatus.

In the pressure container 3B, the liquid 9 is allowed to enter in an amount sufficient to isolate the interior space of the former enlarged part 8A from the open air to form a confined space. When air pressure is applied to the confined space of the pressure container 3B by sending compressed air through the inlet 5, the liquid 9 is pushed downward whereby the level of the liquid in the rear elevated tower part 8 is raised in proportion to the air pressure to form a difference D from the level of the liquid 9 in the former enlarged portion 8A. The function of the liquid 9 in this case is just equivalent to that of mercury used in an ordinary U-shaped manometer. As the front enlarged part 8A is larger in capacity than the rear tower part 8B, the elevation of the level of the liquid 9 in the rear elevated tower part 8B is great as compared with the descent of the level of the liquid 9 in the front enlarged part 8A. By observing the difference D in the tower part 8B, therefore, the air pressure in the confined space can be checked. The elevated tower part 8B must be higher than the difference D corresponding to the maximum air pressure for carrying out evagination of the lining material 4. When the pipe line is very long or has a number of curved or bent portions, the air pressure applied to the confined space should be elevated to strengthen the force required for evagination of the lining material 4. In general, water is used as the liquid 9 but a heavier liquid, e.g. an aqueous dispersion of salt such as a stabilized dispersion of barium sulfate having a specific gravity of greater than 1 may be used particularly in the case of necessitating higher air pressure whereby the difference D can be reduced in proportion to the specific gravity of the liquid used. Anyway, the tower part 8B should be so high that the liquid 9 may not overflow from the top 14.

Figure 2A:
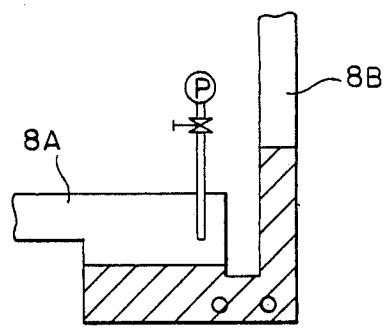
FIGS. 2A, 2B and 2C are schematically depicted longitudinal cross sections of typical models of the pressure container.

FIG. 2A shows a schematically depicted longitudinal cross section of a U-shaped pressure container of this invention. The shape of the rear elevated tower part 8B is usually circular in cross section but may be cubic or rectangular in cross section. The elevation tower part 8B is used in its upright position but may be so designed that it can be inclined or laid down at its bottom as an axis of vertical rotation when the pressure container is not used.

Figure 2B:
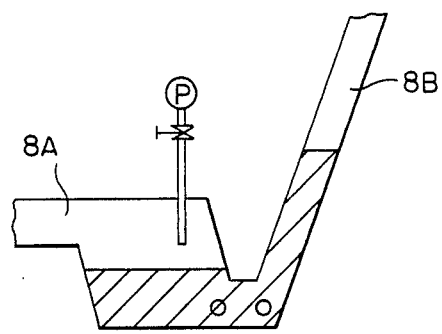

FIG. 2B shows a schematically depicted longitudinal cross section of a V-shaped pressure container of this invention. The shape and function of the rear elevated tower part 8B can be modified as in the case of FIG. 2A.

Figure 2C:
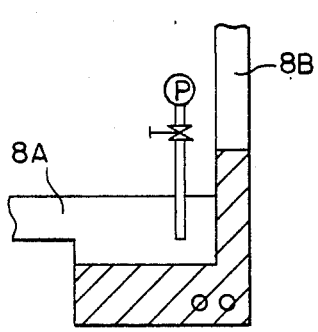

FIG. 2C shows a schematically depicted longitudinal cross section of an L-shaped pressure container of this invention. In this model, the front enlarged part 8A and the rear elevated tower part 8B are integrally combined but separated by a bulkhead the lower part of which has been cut out. In this case, therefore, the structure of the pressure container can be simplified but can attain the equivalent effect.

Figures 2D, 2E:
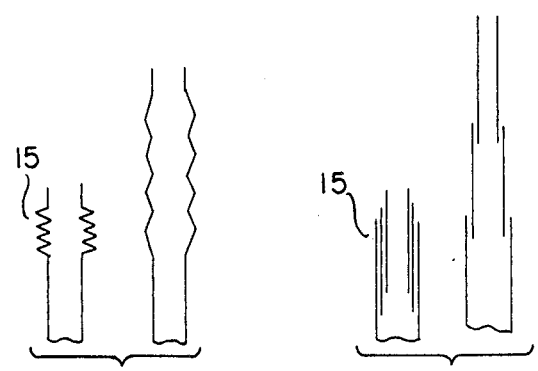
FIGS. 2D and 2E are schematically depicted longitudinal cross sections of modified models of the elevated tower part of the pressure container.

FIG. 2D shows one of the modified examples of the higher part of the rear elevated tower part 8B where the tower part is provided with cornice so that it can be elongated at need.

FIG. 2E shows another modified example of the higher part of the rear elevation tower part 8B where the tower can be stretched telescopically, for example, by the action of an oil cylinder (not shown).

Apart from the models shown in FIGS. 2A–2E, the capacity of the higher part 15 may be increased to achieve almost the same effect as expected in the above models.

Figure 3A:
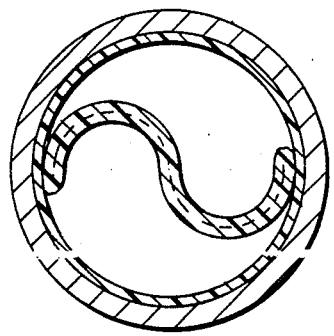
FIG. 3A is a cross section of the tubular lining material in the pipe line before evagination in the ordinary mode.

FIG. 3A shows a cross section of the tubular lining material passed through the lining material evaginated and bonded to the inner surface of the pipe line in ordinary mode. In this state, the width of the flattened tubular lining material is longer than the diameter of the tubular lining material evaginated and bonded to the inner surface of the pipe line so that the flattened tubular lining material is waved in transverse direction. Accordingly, the lining material passing through the lining material already evaginated and bonded to the pipe line is brought into frictional contact with the latter, and as the result, the force required for evagination of the lining material becomes higher.

Figure 3B:
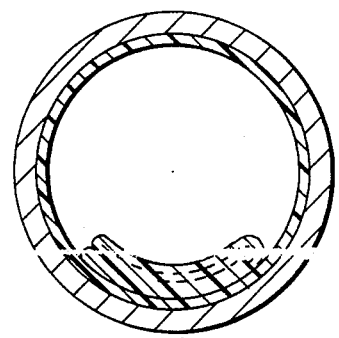
FIG. 3B is a cross section of the tubular lining material in the pipe line before evagination in case of the lining material being folded in lengthwise direction in flattened state.

FIG. 3B shows a cross section of the tubular lining material passed in flattened and folded in lengthwise direction through the lining material already evaginated and bonded onto the inner surface of the pipe line. In this state, the width of the flattened and folded lining material becomes smaller as compared with the case of the ordinary mode. Accordingly, the air pressure required for evagination of the lining material can be reduced and the lining material is free of any damage caused by friction. In addition, the cross section of the top 14 of the rear elevated tower part 8B through which the folded lining material is inserted into the pressure container can be decreased.

For carrying out the lining treatment of a pipe line by using the apparatus shown in FIG. 1, the tubular lining material 4 previously provided on the inner surface thereof with a binder is introduced into the pressure container 3B through the opening at the top 14 of the rear elevated tower part 8B. The lining material is then allowed to pass between a pair of the caterpillar belts 10 and through the induction pipe 3A and finally fastened annularly to one end of the pipe line 1 together with the induction pipe 3A. A liquid 9 such as water is supplied to the pressure container 3B through the pipe 11 by using the pump 13 to isolate the interior space of the front enlarged part 8A from the open air to form a confined pressurizing space. When compressed air is introduced into the pressure container 3B through the inlet 5, the lining material 4 is allowed to advance within the pipe line 1 while being evaginated and the evaginated lining material is bonded to the inner surface of the pipe line 1. The pipe-lining treatment is carried out in such manner and the speed of the lining material 4 introduced into the pipe line 1 is controlled by the caterpillar belts 10. As the liquid 9 is pushed downward in the pressurized confined space, the level of the liquid 9 in the rear elevated tower part 8B is raised in response to the air pressure applied. This state can be confirmed by checking the value on the pressure gauge 6 and the difference D between the level of the liquid 9 in the confined space and the level of the liquid 9 in the elevated tower 8B. By applying air pressure into the pressure container 3B, a turning point of evagination 16 initially formed at the front end of the lining material 4 fastened annularly to the rear end of the pipe line 1 is allowed to advance within the pipe line 1 from one end to the other end to accomplish the lining treatment. If necessary, a leader belt 17 is connected to the lining material 4 and pulled from the opposite end of the pipe line 3 in accordance with the teaching of U.S. Pat. No. 4,334,943 so as to reduce the pressure required for evagination of the tubular lining material 4. The use of such leader belt 17 is especially recommended if the pipe line to be treated is very long or has curved or bent portions. It is also recommended to fold the flattened tubular lining material 4 in lengthwise direction to reduce frictional resistance of the lining material thereby reducing the pressure for evagination of the lining material.

The lining treatment will be finished at the stage that the turning point of evagination exceeds the opposite end of the pipe line 1. After completion of the lining treatment, the butterfly valve was closed so that the interior space of the pipe line can be maintained under pressure until the binder is completely cured. At this stage, the pressure container 3B constituting the main part of the apparatus can be disconnected from the induction pipe 3A. In case the inlet 5 and the pressure gauge 6 are mounted to the induction pipe 3A, it is preferable in that compressed air can occasionally be introduced into the induction pipe 3A to maintain the interior space of the pipe line 1 under pressure. If it is desired to accelerate curing of the binder, the lining material may be connected at its rear end to a flexible hose smaller in diameter than the lining material and having a porous structure. In this case, this flexible hose is introduced into the interior space of the lined pipe line at the stage that the lining treatment has been finished. The butterfly valve 7 is closed at this stage and the pressure container 3B is then disconnected from the induction pipe 3A. A lid provided with an inlet and a fastening means for the flexible hose is then connected to the induction pipe 3A and steam is sent to the flexible hose through the inlet for heating the inside of the lined pipe line to accelerate curing of the binder in accordance with the teaching of U.S. Pat. No. 4,350,548.

Figure 4:
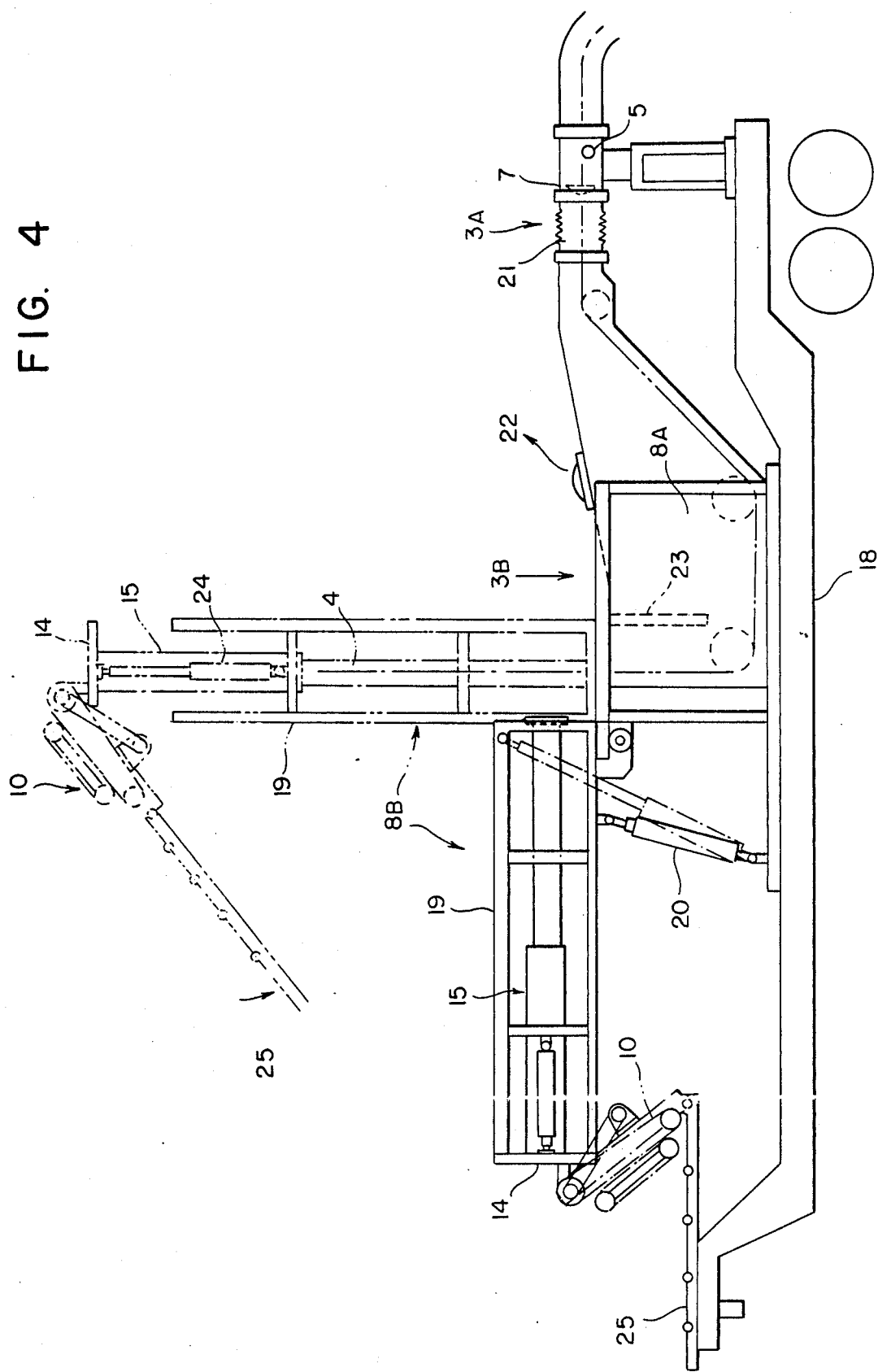
FIG. 4 is a schematic view of another example of the apparatus for actual use.

In FIG. 4 showing another example of the apparatus for actual use, an apparatus similar to that shown in FIG. 1 is assembled and installed on a trailer 18. Accordingly, this apparatus can be transported by a motor vehicle to a place where the pipe-lining treatment is necessary. The elevated tower 8B is supported by a frame 19 and is laid down on the trailer in case the apparatus is not used. The pressure container 3B is a type as shown in FIG. 2C and the elevated tower part 8B is set upright on actual use as shown by a chain line by the action of an oil cylinder 20 positioned on the trailer 18.

The induction pipe 3A is installed at the front end of the trailer 18 and is provided in the rear part thereof with an inlet 5 for compressed air and a butterfly valve 7. The induction pipe 3A has a bellows tube 21 at its rear end and connected to the front end of the pressure container 3B so that the movement of the induction pipe 3A is flexible against the pressure container 3B. The pressure container 3B has a window 22 equipped with a looking glass on the central part of its top plate and is provided in the interior thereof with a bulkhead 23 the lower part of which is cut out to form an opening connecting the front enlarged part 8A and the rear elevated tower part 8B. The higher part 15 of the elevated tower part 8B can be stretched telescopically at need to increse the height thereof by the action of an oil cylinder 24. The top 14 of the elevated tower part 8B is opened to form an entrance of a tubular lining material 4 and a liquid which can isolate the interior of the front enlarged part 8A from the open air to form a confined pressuring space. The tubular lining material 4 is conveyed in flattened state, if desired, folded in lengthwise direction on a roller conveyer 25 and then passed between a pair of conveyer belts 10. In this example, the coveyer belts 10 are mounted to the top 14 of the elevated tower part 8B but may be installed in the confined space of the pressure container 3B. In the latter case, however, the capacity of the front enlarged part 8A must be larger. Alternatively, the lining treatment can be carried out without using belt conveyers.

On actual use of the apparatus shown in FIG. 4, the trailer 18 carrying thereon the apparatus is transported to a place in the neighborhood of a hole where one end of the pipe line is exposed. A proper amount of the liquid such as water is introduced into the pressure container 3B through the entrance formed at the top of the elevated tower part 8B to isolate the space in the front enlarged part 8A from the open air. The lining material 4 previously provided in the inner surface thereof with a binder is then introduced into the pressure container 3B through the entrance and passed through several guide rolls in the pressure container 3B dipped in the liquid whereby the lining material can be sealed with the liquid as a sealing medium without being squeezed mechanically. The front end of the lining material is then passed through the induction pipe 3A and annularly fixed at one end of the pipe line. The lining treatment is carried out in the same manner as described with respect to the apparatus shown in FIG. 1, for example, by sending compressed air from the inlet 5 whereby the liquid in the pressure container 3B is pushed downwards to elevate the level of the liquid in the elevated tower part 8B thereby making a pressure difference D in proportion to the pressure of the compressed air. As described with respect to the apparatus shown in FIG. 1, a leader belt may be attached to the lining material and pulled from the opposite end of the pipe line in accordance with the teaching disclosed in U.S. Pat. No. 4,334,943 to facilitate the lining treatment of the pipe line, especially in case it is very long or has a number of curved or bent portions. Further, a flexible porous hose may be connected to the rear end of the lining material so that the hose may be introduced into the interior space of the lined pipe line after completion of the lining treatment and steam is then sent to the hose for heating the lining material to accelerate curing of the binder in accordance with the teaching disclosed in U.S. Pat. No. 4,350,548. In such after-treatment, the pressure container is disconnected from the induction pipe 3A after closing the butterfly valve 7 and a lid provided with the inlet for steam and a fastening means for the hose can be attached to the induction pipe 3A in the same manner as described with respect to the apparatus shown in FIG. 1.

According to the present invention, advance of the lining material within the pipe line under evagination is carried out by air pressure so that no difference in pressure is formed even if the pipe line is inclined in vertical direction unlike the case of using a liquid as a pressurizing medium. In the method of this invention, there is no damage of the lining material nor failure in bonding during the lining treatment unlike the case of using a liquid for evagination of the lining material. In the present invention, the amount of a liquid used for sealing is very small and the liquid itself is not allowed to enter in the pipe line. Thus, there is no necessity of discharging a great amount of a liquid from the pipe line after completion of the lining treatment according to a method wherein the liquid is used as a pressurizing fluid for evagination of the lining material. Since no water exists in the lined pipe line according to the present invention, acceleration of curing of the binder by heating can easily be performed.

In the present invention, sealing of the pressure container is made simply by charging a small amount of a liquid into the pressure container provided with a manometer-like elevated tower part. Thus, the structure of the sealing device is very simple but its sealing efficiency is very high so that no leakage of a gas is observed. According to the present invention, the lining material previously provided in the inner surface with a binder is not strongly squeezed by a mechanical means in the conventional of method. Thus, the lining material still carries a sufficient amount of a binder even after passing through the sealing device so that the bonding of the lining material onto te inner surface of the pipe line is very good. Contrary to this, the content of a binder is decreased when the lining material is passed through a sealing device where the binder is squeezed in the conventional methods.

As many apparently widely different embodiments of the present invention may be made without departing from the spirit and scope thereof, it is to be construed that the present invention is not limited to the specific embodiments thereof except as defined in the appended claims.

What is claimed is:

1. An apparatus for lining pipe lines wherein a flexible tubular lining material provided on the inner surface thereof with a binder and on the outer surface thereof with an air-impervious coating is inserted into a pipe line, with the front end of the lining material being fixed annularly to one end of the pipe line to form a turning point of evagination, and allowed to advance within the pipe line while moving the turning point of evagination forwards from one end to the other end of the pipe line to turn the tubular lining material inside out under fluid pressure thereby applying the evaginated lining material onto the inner surface of the pipe line over its full length with the binder on the exterior surface of the evaginated tubular lining material being interposed between the pipe line and the lining material, said apparatus comprising an induction pipe provided at a front end thereof with a fastener for annularly fixing the tubular lining material, a pressure container connected to a rear end of the induction pipe and comprised of a front enlarged part forming a confined space for producing a pressurized gas and a rear elevated toward part, liquid seal means isolating the confined space from open air and partially filling the pressure container and an inlet for introducing a compressed gas, which is formed in the induction pipe and/or the pressure container.

2. The apparatus according to claim 1, wherein the pressure container is in a U- or V-shaped form in longitudinal cross section and its front enlarged part is larger in capacity than its rear elevated tower part.

3. The apparatus according to claim 1, wherein the pressure container is an approximate L-shape form in longitudinal cross section in which the front enlarged part having a larger capacity and the rear elevated tower part are integrally combined but separated by a bulkhead the lower part of which has been cut out.

4. The apparatus according to claims 2 or 3, wherein the rear elevated tower part is flexible in length so that its capacity becomes larger as its height increases.

5. The apparatus according to claim 1, wherein the induction pipe is provided at a rear part thereof with a butterfly valve and at the rear end thereof with a fastening means which can be connected to the pressure container.

* * * * *